(12) United States Patent
Lim et al.

(10) Patent No.: US 8,561,597 B2
(45) Date of Patent: Oct. 22, 2013

(54) FLANGE FOR FUEL PUMP MODULE AND MANUFACTURING METHOD THEREOF

(75) Inventors: Jong Keun Lim, Cheongju-si (KR); In Seok Sohn, Cheongju-si (KR); Young Chang Kim, Cheongju-si (KR); Joon Seup Kim, Daejeon (KR); Mun Sik Jeon, Cheongju-si (KR); Jin Seok Kim, Sinheung-ri (KR)

(73) Assignee: Coavis, Yeongi-gun (KR)

( * ) Notice: Subject to any disclaimer, the term of this patent is extended or adjusted under 35 U.S.C. 154(b) by 379 days.

(21) Appl. No.: 13/004,483

(22) Filed: Jan. 11, 2011

(65) Prior Publication Data
US 2011/0168136 A1    Jul. 14, 2011

(30) Foreign Application Priority Data
Jan. 12, 2010  (KR) .......................... 10-2010-0002577

(51) Int. Cl.
*F02M 37/04*  (2006.01)
*B29B 13/00*  (2006.01)

(52) U.S. Cl.
USPC ...................................... 123/509; 264/271.1

(58) Field of Classification Search
USPC ............ 264/275, 279.1, 274, 271.1; 123/509; 425/184, 191, 192 R, 468; 249/177, 249/186
See application file for complete search history.

(56) References Cited

U.S. PATENT DOCUMENTS

| | | | | |
|---|---|---|---|---|
| 4,011,652 | A | * | 3/1977 | Black .............................. 29/455.1 |
| 4,421,378 | A | * | 12/1983 | Sanford et al. ................. 439/686 |
| 5,522,417 | A | * | 6/1996 | Tomioka et al. ................. 137/43 |
| 6,082,780 | A | * | 7/2000 | Rowley et al. .............. 285/132.1 |
| 6,905,147 | B2 | * | 6/2005 | Kertesz ....................... 285/285.1 |
| 7,455,806 | B2 | * | 11/2008 | Junger et al. ................... 264/516 |
| 2009/0056680 | A1 | * | 3/2009 | Hill et al. ....................... 123/520 |
| 2011/0168136 | A1 | * | 7/2011 | Lim et al. ....................... 123/509 |

* cited by examiner

*Primary Examiner* — Thomas Moulis
(74) *Attorney, Agent, or Firm* — The Webb Law Firm

(57) ABSTRACT

A flange for a fuel pump module and a manufacturing method thereof, in which the passage communicating a first valve seat with a second valve seat in the flange can be easily and simply formed by inserting a passage forming piece in a mold without requiring an additional process during an injection-molding process of manufacturing the flange.

6 Claims, 9 Drawing Sheets

PRIOR ART

PRIOR ART

FLANGE FOR FUEL PUMP MODULE AND MANUFACTURING METHOD THEREOF

BACKGROUND OF THE INVENTION

1. Field of the Invention

The present invention relates, in general, to a flange for a fuel pump module and a manufacturing method thereof and, more particularly, to a flange for a fuel pump module and a manufacturing method thereof, in which a passage communicating a first valve seat with a second valve seat in the flange can be easily formed by inserting a passage forming piece in a mold during a process of manufacturing the flange.

2. Description of the Related Art

Generally, a vehicle operated by an internal combustion engine using liquid fuel, such as a gasoline engine or a diesel engine, is provided with a fuel tank for storing fuel. In the vehicle, a fuel pump module is installed in the fuel tank to forcibly feed the fuel stored in the fuel tank to the internal combustion engine.

A conventional fuel pump module is shown in FIG. 1.

The fuel pump module comprises a flange assembly 1, which is securely mounted to a fuel tank, and a reservoir body assembly 2, which is connected to the flange assembly 1 by guide rods 3 at a location below the flange assembly 1 and includes a fuel filter and a fuel pump.

The flange assembly 1 comprises: a flange 10, which forms a flange body and includes a first valve seat 12, a second valve seat 13 and an outlet port 11, the outlet port 11 being connected to an internal combustion engine by a connection hose and thereby feeding fuel to the engine; a roll over valve (ROV) 15 provided in the first valve seat 12; and a fuel limit vent valve (FLVV) 16 provided in the second valve seat 13.

Here, the flange assembly 1 further includes a signal transmitting unit for transmitting electric signals to the fuel pump of the reservoir body assembly 2 and an on-board diagnostic (OBD) sensor for controlling the supply of fuel.

Typically, the fuel stored in the fuel tank or in the fuel pump module vaporizes and increases internal pressure of the fuel tank or the fuel pump module. The vapor gas of the fuel imposes ill-effects on the environment, so that particularly in North America, the amount of vapor gas vaporized from fuel into the atmosphere during the process of filling the fuel tank with the fuel has been regulated.

Therefore, in an effort to control the internal pressure of the fuel tank or the fuel pump module, both the roll over valve 15 and the fuel limit vent valve 16 are provided in the flange 10, with a canister being connected both to the roll over valve 15 and to the fuel limit vent valve 16 and purging the vapor gas to the internal combustion engine during operation of the engine or expelling part of the vapor gas.

Described in detail, the roll over valve 15 is provided in the first valve seat 12 of the flange 10 and connects the first valve seat 12 to the canister in response to a variation in the internal pressure, thus regulating the internal pressure both of the fuel pump module and of the fuel tank and preventing fuel from leaking out into the atmosphere in the event of a turnover accident in which the vehicle body is turned upside down.

The fuel limit vent valve 16 is provided in the second valve seat 13 of the flange 10, in which the second valve seat 13 communicates with the first valve seat 12, so that the fuel limit vent valve 16 becomes coupled to the roll over valve 15 and determines the amount of fuel to be filled in the fuel tank, and restrains the vapor gas.

In other words, to allow the roll over valve 15 and the fuel limit vent valve 16 to be coupled together, the first valve seat 12 must communicate with the second valve seat 13 by a passage 14. In order to form the passage 14 in the flange 10, the flange 10 was produced with a mold 20 that was inserted in one direction such that the mold 20 can connect the first valve seat 12 to the second valve seat 13, as shown in FIG. 2, so that an opening 14' undesirably remains in the flange 10.

Therefore, it is necessary to close the opening 14' after manufacturing the flange, so that a process for closing the opening must be added and an additional closing member must be used along with the requirement of cost and time consumption for preparing the closing member. For example, a cap may be used as a closing member for closing the opening. However, the cap may be responsible for fuel leaking or fuel gas leaking from the flange.

SUMMARY OF THE INVENTION

Accordingly, the present invention has been made keeping in mind the above problems occurring in the related art, and the present invention is intended to propose a flange for a fuel pump module and a manufacturing method thereof, in which a passage communicating a first valve seat with a second valve seat in the flange can be easily and simply formed by inserting a passage forming piece in a mold without requiring an additional process during a process of manufacturing the flange.

Particularly, the present invention is intended to propose a flange for a fuel pump module and a manufacturing method thereof, which can use a metal material, such as steel having a predetermined strength, as the material of the passage forming piece, thus increasing the durability of the flange and realizing easier manufacture of the flange.

In order to achieve the above objects, according to one aspect of the present invention, there is provided a method of manufacturing a flange for a fuel pump module, the flange being mounted to a fuel tank and comprising: an outlet port connected to an internal combustion engine by a connection hose and feeding fuel to the engine, a first valve seat provided with a first valve, a second valve seat provided with a second valve, and a passage communicating the first valve seat and the second valve seat with each other, the method comprising: inserting a passage forming piece into a mold during an injection-molding process of manufacturing the flange, thus integrally forming the passage in the flange.

In the method, the passage forming piece may use a hollow tubular piece.

Further, the passage forming piece may have a stepped part formed by circumferentially grooving the outer surface of the piece at a location between the first valve seat and the second valve seat.

In another aspect of the present invention, there is provided a flange for a fuel pump module, manufactured by the above-mentioned method.

As described above, the flange for the fuel pump module and the manufacturing method thereof according to the present invention are advantageous in that the passage communicating the first valve seat with the second valve seat in the flange can be easily and simply formed by inserting the passage forming piece in the mold without requiring an additional process during the process of manufacturing the flange.

Further, the present invention is advantageous in that a metal material, such as steel having a predetermined strength, can be used as the material of the passage forming piece, thus increasing the durability of the flange and realizing easier manufacture of the flange.

BRIEF DESCRIPTION OF THE DRAWINGS

The above and other objects, features and other advantages of the present invention will be more clearly understood from the following detailed description when taken in conjunction with the accompanying drawings, in which.

DESCRIPTION OF THE ELEMENTS IN THE DRAWINGS

Figure 1:
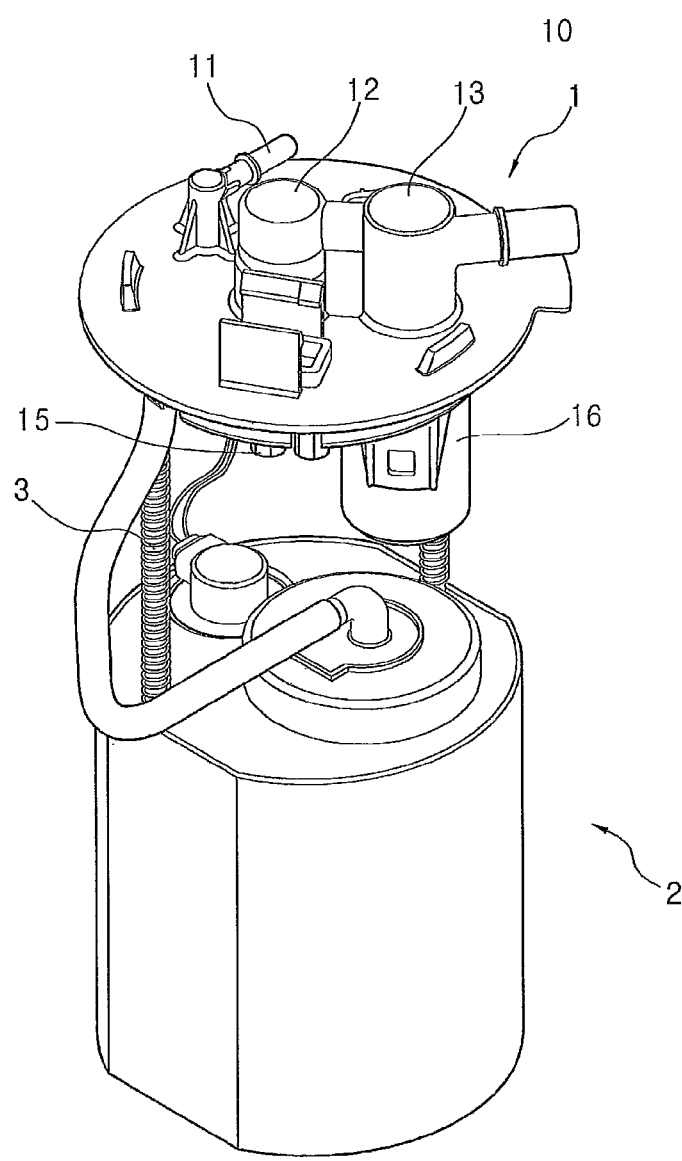
FIG. 1 is prior art and is a view illustrating a convention fuel pump module.
Figure 2:
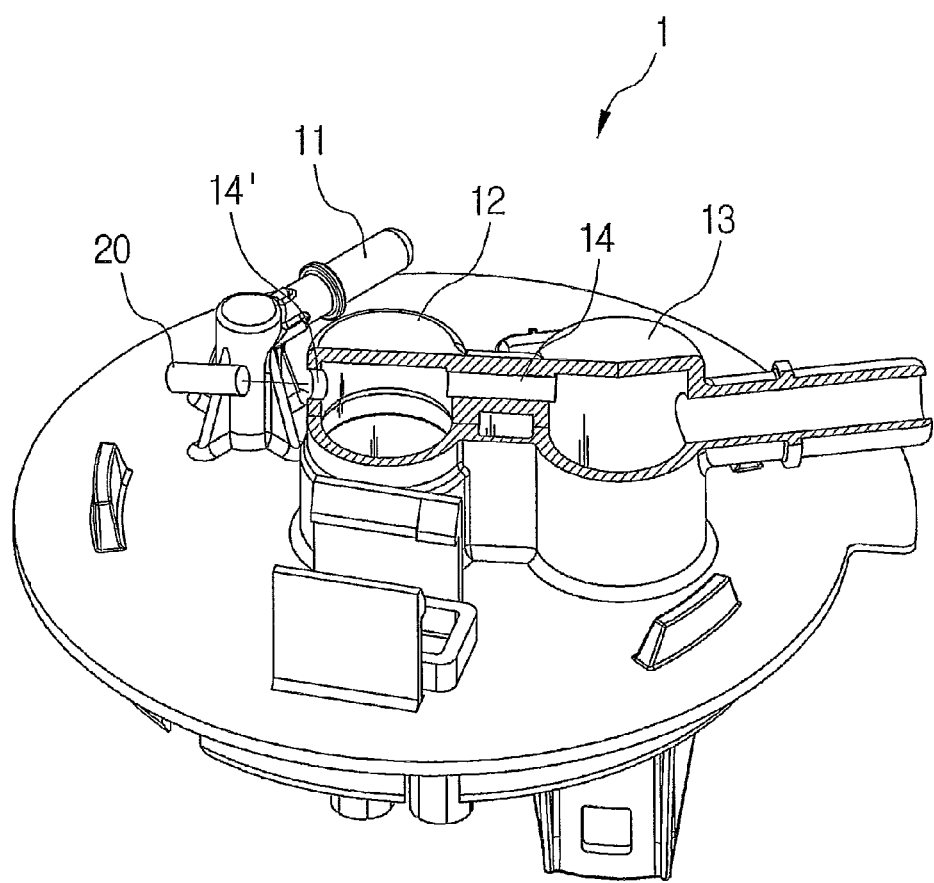
FIG. 2 is prior art and is a view illustrating a method of manufacturing a conventional flange for a fuel pump module.

1000: flange
200: first valve seat
400: passage
411: stepped part
520: lower mold
522: second core
Sa~Se: operations of manufacturing the flange
100: outlet port
300: second valve seat
410: passage forming piece
510: upper mold
521: first core

DETAILED DESCRIPTION OF THE INVENTION

Hereinbelow, preferred embodiments of a flange for a fuel pump module and a manufacturing method thereof according to the present invention will be described in detail with reference to the accompanying drawings.

Figure 3:
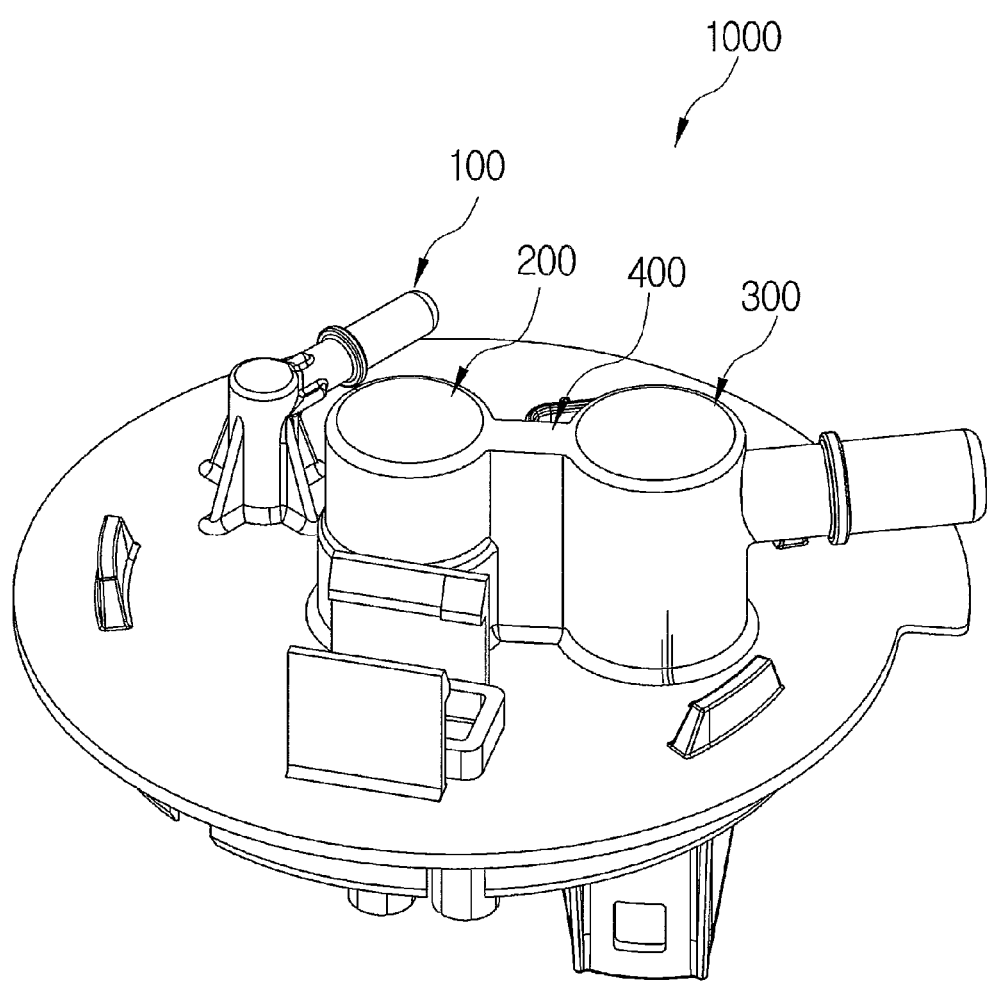
FIGS. 3 through 5 are a perspective view, a partially broken perspective view and a sectional view of a flange for a fuel pump module according to the present invention.
Figure 4:
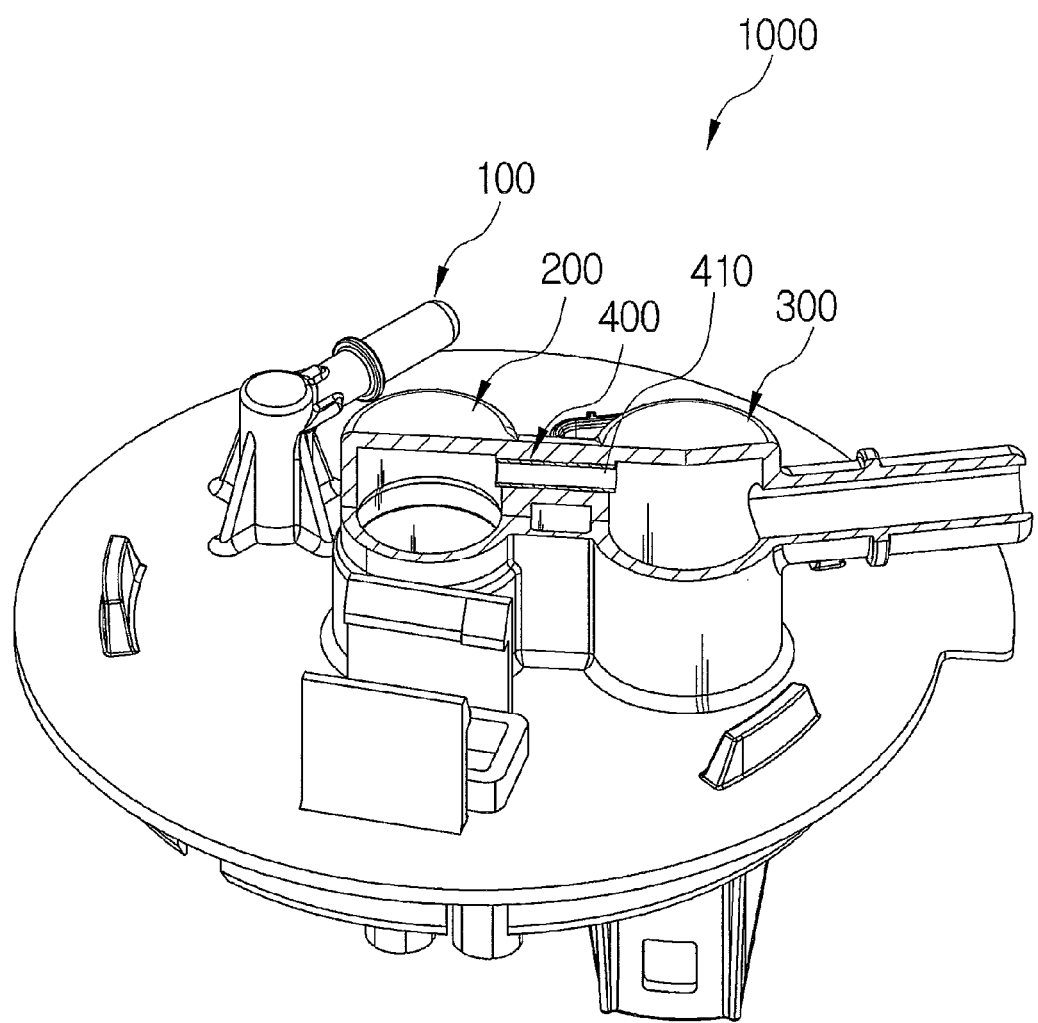
Figure 5:
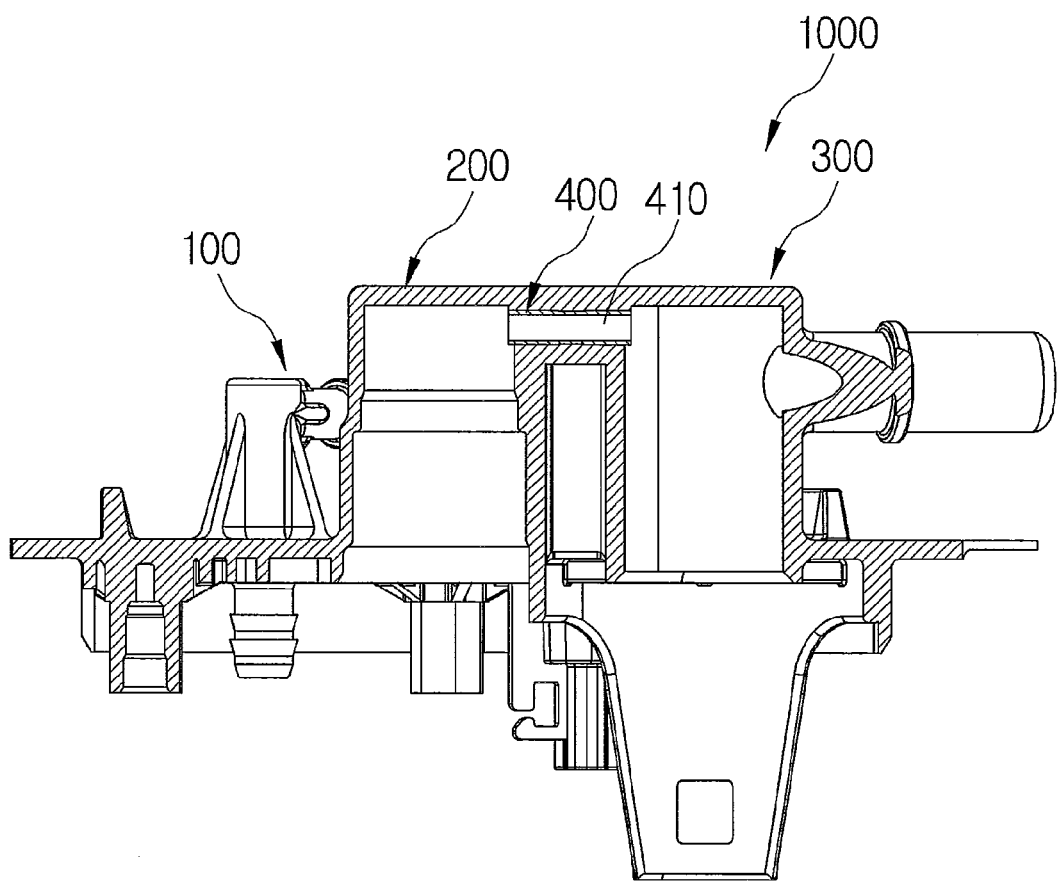
Figure 6:
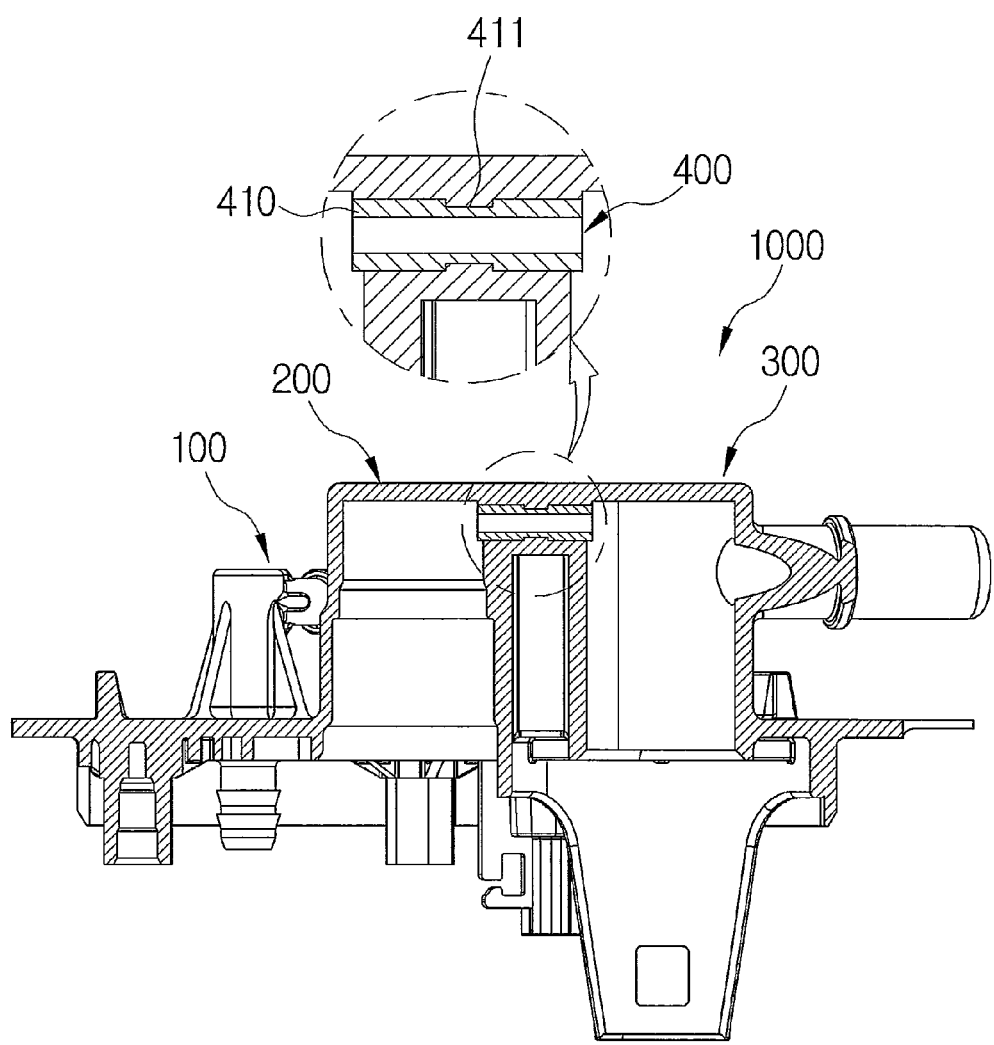
FIG. 6 is a sectional view illustrating a flange for a fuel pump module according to another embodiment of the present invention.

FIGS. 3 through 5 are a perspective view, a partially broken perspective view and a sectional view of a flange for a fuel pump module according to the present invention. FIG. 6 is a sectional view illustrating the flange of the present invention.

The present invention relates to a flange 1000 for a fuel pump module and a method of manufacturing the flange. In the method of manufacturing the flange 1000 for the fuel pump module according to the present invention, a passage forming piece 410 for forming a passage 400 in the flange is inserted into a mold during operation of injection-molding the flange 1000, thus being integrally molded with the flange.

The flange 1000 for the fuel pump module according to the present invention is securely mounted to a fuel tank and is connected by guide rods to a reservoir body assembly placed at a location below the flange. The flange 1000 comprises an outlet port 100, which is connected to an internal combustion engine by a connection hose and feeds fuel to the engine, a first valve seat 200 provided with a first valve, a second valve seat 300 provided with a second valve, and a passage 400 communicating the first valve seat 200 with the second valve seat 300.

Here, in the method of manufacturing the flange 1000 for the fuel pump module, the passage 400 is integrally formed in the flange 1000 by inserting a passage forming piece 410 in a mold without using an additional core during a process of injection-molding the flange 1000.

In the present invention, the first valve may be a roll over valve (ROV), while the second valve may be a fuel limit vent valve (FLVV).

In the method of manufacturing the flange 1000 for the fuel pump module according to the present invention, the passage forming piece 410 may use a hollow tubular piece as shown in FIGS. 4 and 5, and the interior space of the hollow tubular piece defines the passage 400.

When the passage forming piece 410 uses the tubular piece, the passage forming piece 410 is inserted into a mold in such a way that the opposite ends of the piece 410 are seated to be in close contact with respective cores used for forming the first and second valve seats 200 and 300. Therefore, a material injected into the mold to form the flange 1000 is prevented from flowing into the interior space of the piece 410 and thereby a desired passage 400 can be formed in the flange.

When the passage forming piece 410 is integrated with the flange 1000 into a single body and is used as an element of the fuel pump module of the present invention, it is preferred that the passage forming piece 410 be selected from steel pipe pieces which are unreactive with the fuel, yet can increase the durability of the flange.

FIG. 6 is a sectional view illustrating a flange 1000 for a fuel pump module according to another embodiment of the present invention. As shown in FIG. 6, the passage forming piece 410 integrated with the flange 1000 at the location between the first valve seat 200 and the second valve seat 300 has a stepped part 411, which is formed by circumferentially grooving the outer surface of the piece 410.

When the stepped part 411 is formed around the outer circumferential surface of the passage forming piece 410 as described above, the material injected into the mold to form the flange 1000 can fill in the stepped part 411 and can increase the fixing force between the flange 1000 and the passage forming piece 410. Described in detail, when both a first core 521 for forming the first valve seat 200 and a second core 522 for forming the second valve seat 300 are removed after the injection-molding process of manufacturing the flange 1000 of the present invention has been completely finished, the stepped part 411 can prevent the passage forming piece 410 from moving towards either of the first valve seat 200 and the second valve seat 300.

The flange 1000 for the fuel pump module according to the present invention can be manufactured by the above-mentioned method.

In the method of manufacturing the flange 1000 for the fuel pump module according to the present invention, the passage 400 communicating the first valve seat 200 with the second valve seat 300 in the flange 1000 can be easily and simply formed by inserting the passage forming piece 410 in the mold without requiring an additional process during the process of manufacturing the flange 1000.

Figure 7:
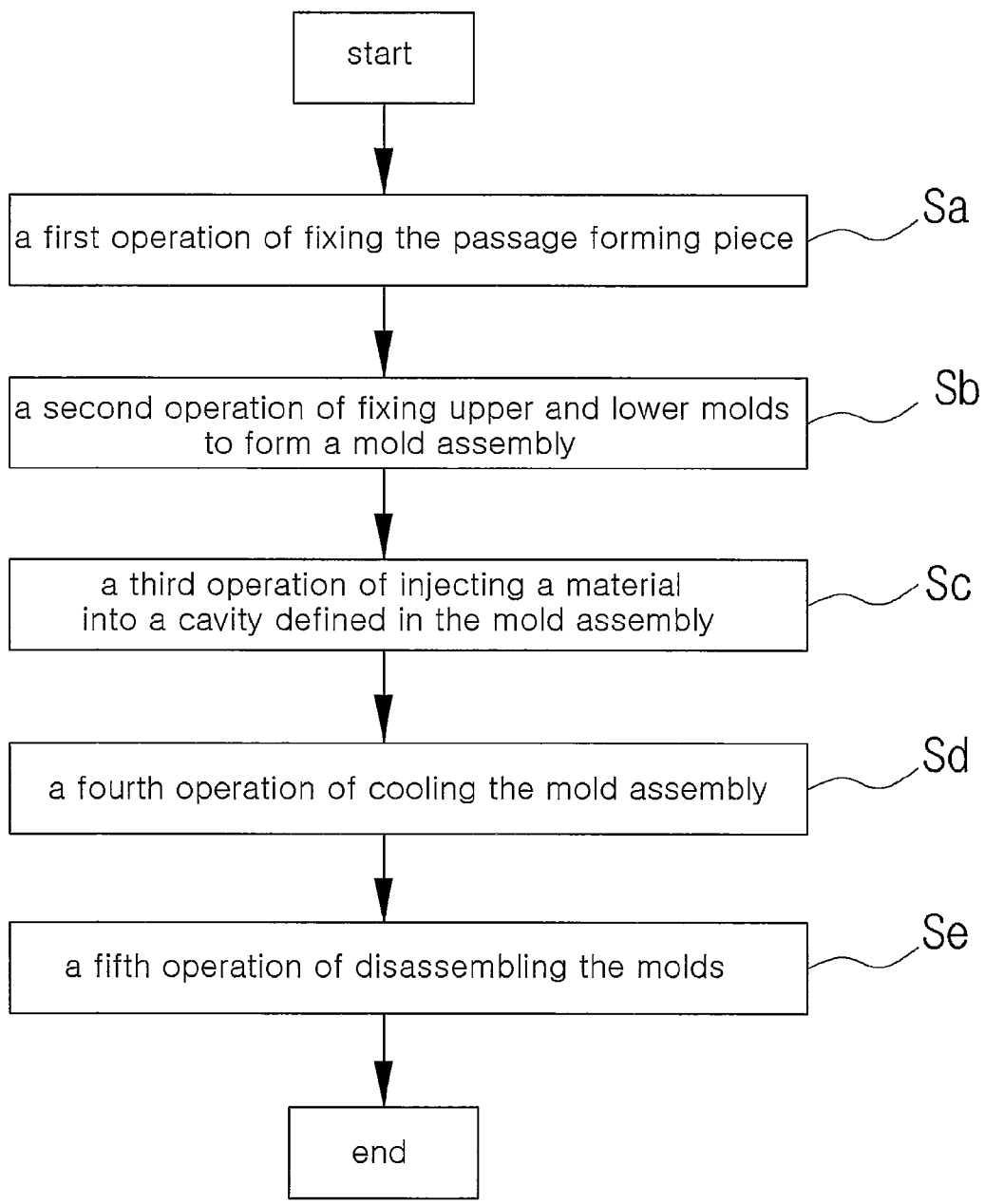
FIG. 7 is a view illustrating a method of manufacturing the flange for the fuel pump module according to the present invention.

FIG. 7 is a view illustrating the method of manufacturing the flange 1000 for the fuel pump module according to the present invention. As shown in FIG. 7, the method of manufacturing the flange 1000 for the fuel pump module according to the present invention comprises: a first operation Sa of fixing the passage forming piece 410; a second operation Sb of fixing upper and lower molds 510 and 520 to form a mold assembly; a third operation Sc of injecting a material into a cavity defined in the mold assembly; a fourth operation Sd of cooling the mold assembly; and a fifth operation Se of disassembling the molds.

Figure 8:
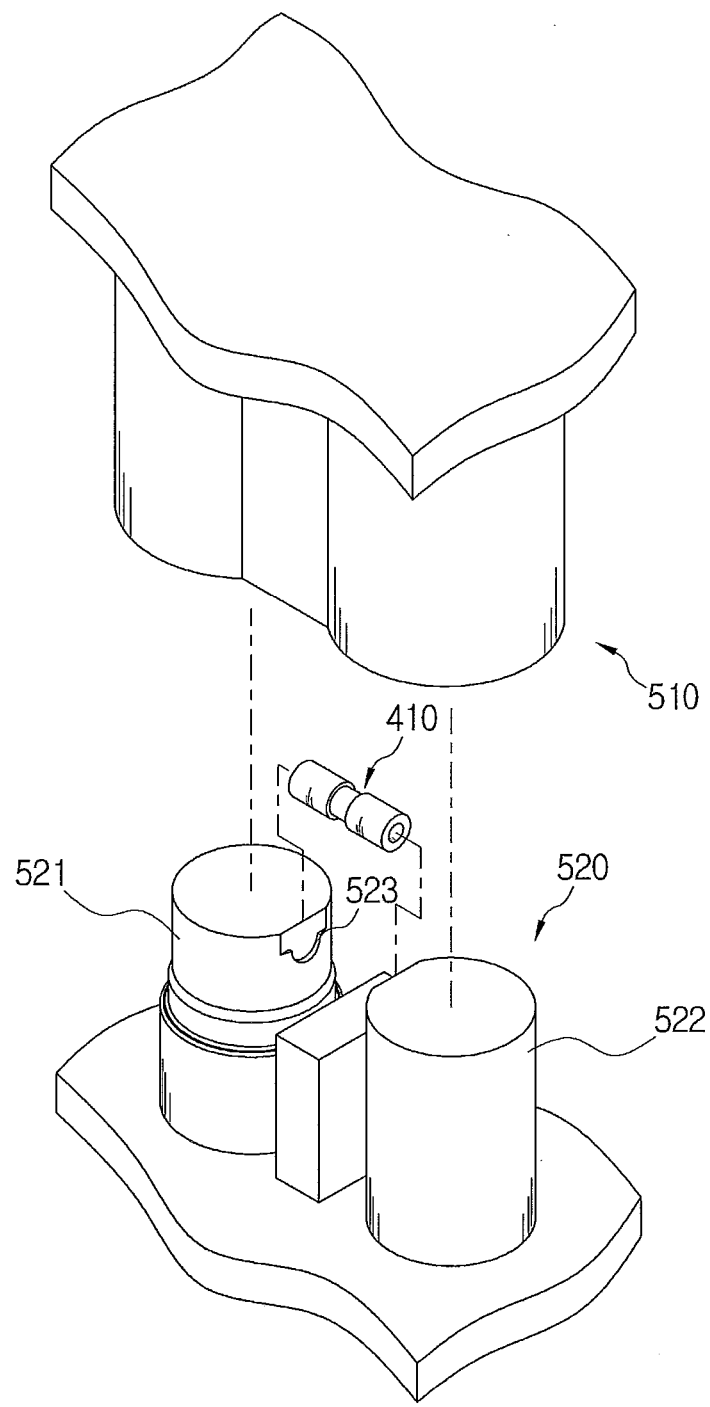
FIG. 8 is a view illustrating the operation of fixing a passage forming piece in a method of manufacturing the flange of the present invention.

In the first operation Sa of fixing the passage forming piece 410, the passage forming piece 410 is fixed in a predetermined location between the first core 521 and the second core 522, which are parts of the lower mold 520 and form the first valve seat 200 and the second valve seat 300, respectively, as shown in FIG. 8.

Here, a semicircular holding groove 523 for holding the passage forming piece 410 therein is formed in a predetermined portion of each of the first and second cores 521 and 522 in such a way that the opposite ends of the passage forming piece 410 can be held in respective holding grooves 523 when the piece 410 is seated in the grooves 523 downwards.

In the above state, the opposite ends of the passage forming piece 410 are in close contact with the first and second cores 521 and 522, so that the injected material can be prevented from flowing into the interior space of the passage forming piece 410.

In order to prevent the injected material from flowing into the interior space of the passage forming piece 410, it is required to tightly seat the passage forming piece 410 between the first core 521 and the second core 522. To accomplish the tight sitting of the passage forming piece 410 in the space between the first and second cores 521 and 522, the interval between the first and second cores 521 and 522 is designed to be slightly smaller than the length of the passage forming piece 410. When the passage forming piece 410 is forcibly seated between the first and second cores 521 and 522, the opposite ends of the passage forming piece 410 can be brought into close and tight contact with the first and second cores 521 and 522.

Here, the fixing of the passage forming piece 410 in the space between the first core 521 and the second core 522 is executed in such a way that the passage forming piece 410 can stably be retained in the desired space between the two cores 521 and 522 during the third operation of injecting the material into the cavity and the fourth operation of cooling the molds, yet the upper mold 510 and the lower mold 520 can still be easily removed during the fifth operation wherein the molds are disassembled.

Figure 9:
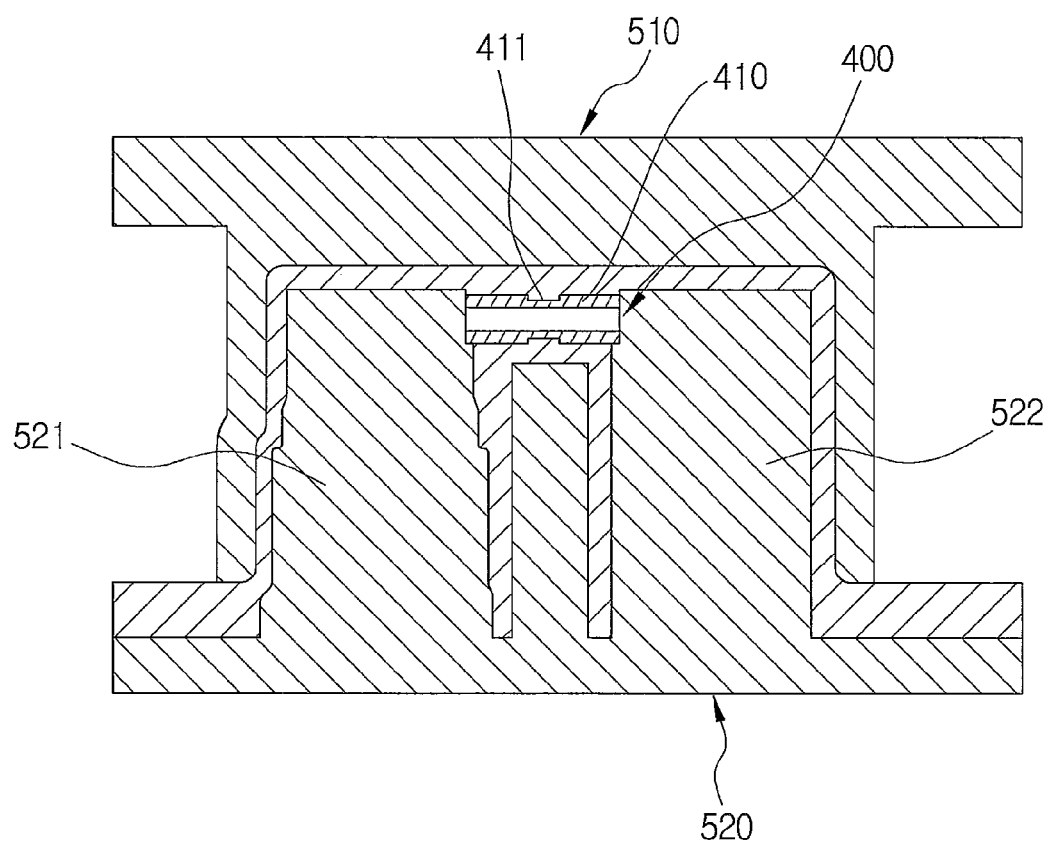
FIG. 9 is a sectional view illustrating an assembled state of the upper and lower molds in the method of manufacturing the flange of the present invention.

In the second operation Sb of fixing the upper and lower molds 510 and 520, the upper mold 510 and the lower mold 520 are assembled with each other to form a mold assembly for molding the flange 1000, as shown in FIG. 9.

In the third operation Sc of injecting the material, the material is injected through a gate into the cavity defined between the upper and lower molds 510 and 520 of the mold assembly. Thereafter, the cooling operation Sd and the mold disassembling operation Se are sequentially executed, thus manufacturing the flange 1000 of the present invention.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of manufacturing a flange for a fuel pump module, the flange being mounted to a fuel tank and comprising: an outlet port connected to an internal combustion engine by a connection hose and feeding fuel to the engine, a first valve seat provided with a first valve, a second valve seat provided with a second valve, and a passage communicating the first valve seat and the second valve seat with each other, the method comprising:
    inserting a passage forming piece into a mold during an injection-molding process of manufacturing the flange, thus integrally forming the passage in the flange
    wherein the passage forming piece is fixed between a first core for forming the first valve seat and a second core for forming the second valve seat, and
    the interval between the first and second cores is designed to be smaller than the entire length of the passage forming piece, so that the passage forming piece is forcibly seated between the first and second cores.

2. The method of manufacturing the flange as set forth in claim 1, wherein the passage forming piece is a hollow tubular piece.

3. The method of manufacturing the flange as set forth in claim 2, wherein the passage forming piece has a stepped part formed by circumferentially grooving an outer surface of the piece at a location between the first valve seat and the second valve seat.

4. A flange for a fuel pump module, manufactured by the method as set forth in claim 1.

5. A flange for a fuel pump module, manufactured by the method as set forth in claim 2.

6. A flange for a fuel pump module, manufactured by the method as set forth in claim 3.

* * * * *